(No Model.) 2 Sheets—Sheet 1.
C. KONOLD.
DIE FOR MAKING VISE JAWS.
No. 337,339. Patented Mar. 2, 1886.
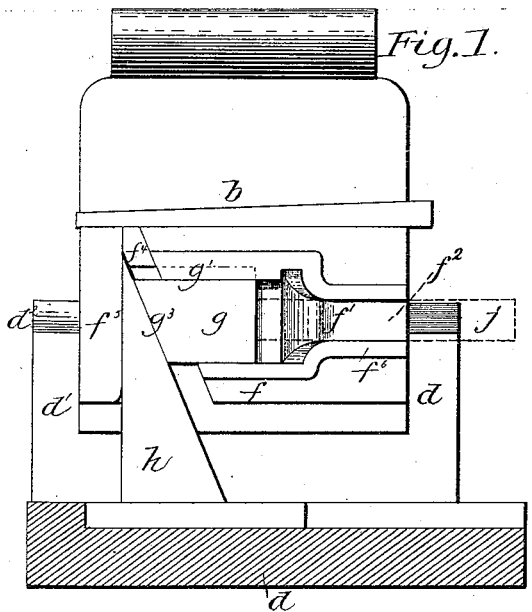
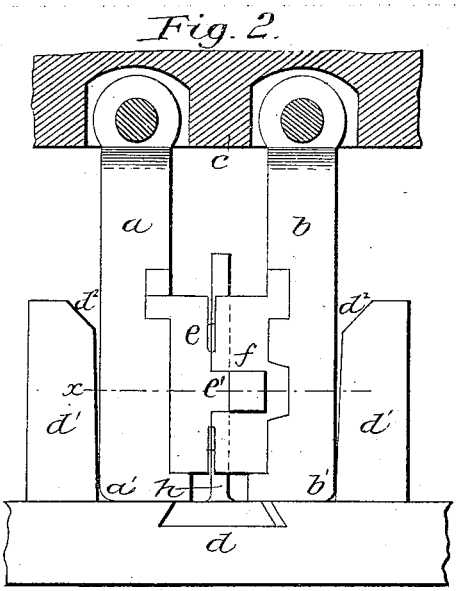
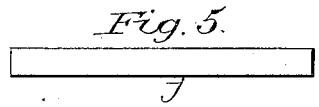
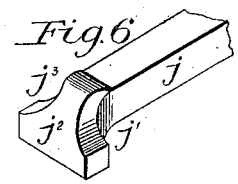
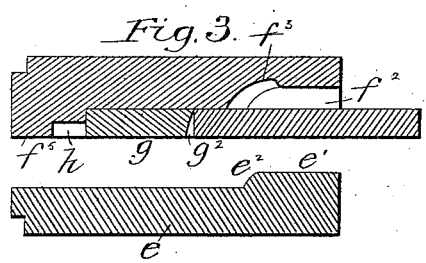
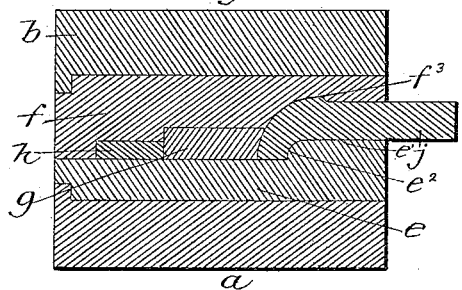
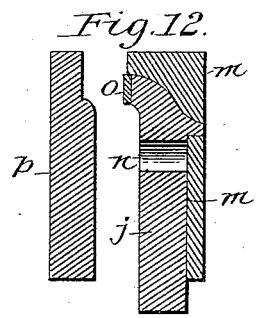
Witnesses:
N. B. Corwin
H. L. Gill
Inventor,
Christian Konold
by his Attorneys
Bakewell & Kerr
N. PETERS, Photo-Lithographer, Washington, D. C.

(No Model.) 2 Sheets—Sheet 2.
C. KONOLD.
DIE FOR MAKING VISE JAWS.
No. 337,339. Patented Mar. 2, 1886.
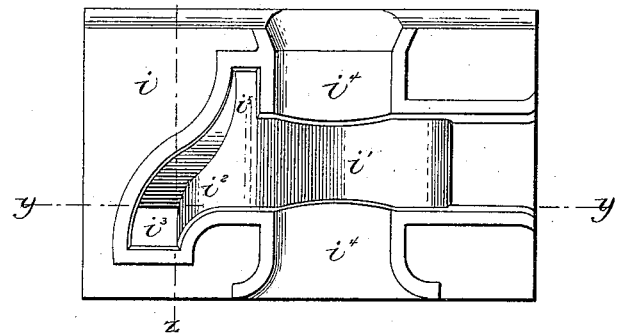
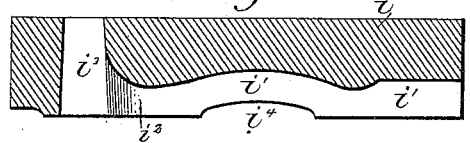
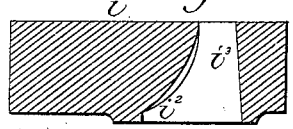
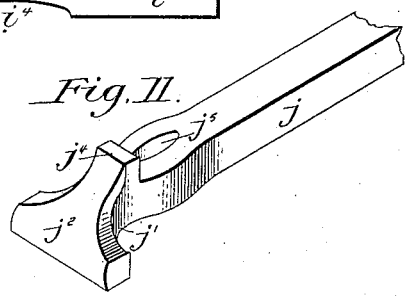
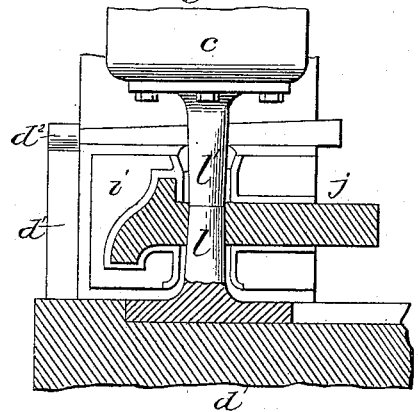
Witnesses:
Inventor.
Christian Konold
by his Attorneys
Bakewell & Kerr

UNITED STATES PATENT OFFICE.

CHRISTIAN KONOLD, OF ROSS, ALLEGHENY COUNTY, PENNSYLVANIA.

DIE FOR MAKING VISE-JAWS.

SPECIFICATION forming part of Letters Patent No. 337,339, dated March 2, 1886.

Application filed September 25, 1885. Serial No. 178,113. (No model.)

*To all whom it may concern:*

Be it known that I, CHRISTIAN KONOLD, of Ross township, in the county of Allegheny and State of Pennsylvania, have invented a new and useful Improvement in Dies for Forming Vise-Jaws; and I do hereby declare the following to be a full, clear, and exact description thereof.

Heretofore vise-jaws have commonly been made by hand-forging. A suitable bar of iron was taken, heated, and then the end split and drawn out laterally to form a T at one side and a spur at the other. A flat piece of iron constituting the body was then welded to one side of the T, and then a piece of steel was welded to the face of the iron to form a hard bit. In some cases the steel was welded to the iron and then the latter was welded to the T. This operation was not only slow and involved a large amount of labor, but the frequent reheating of the metal was injurious thereto and especially to the steel bit. The jaw so produced, being composed of a number of pieces welded together, did not have the requisite strength and was liable to show defects after finishing and on use, which defects were frequently the cause of breakage.

My invention consists of improved dies for making vise-jaws of a single piece of metal, with the exception of the steel bit, which, being of a different character of material, is subsequently welded thereto.

To enable others skilled in the art to make and use my invention, I will now describe it by reference to the accompanying drawings, forming a part of this specification, in which—

Figure 1 is a side view of a portion of an improved machine which forms the subject of my application No. 132,234, filed May 21, 1884, in which my improved dies are shown and may be used, the blank being shown in dotted lines in position to be operated on by the dies. Fig. 2 is an end view of the machine, the parts being in another position. Figs. 3 and 4 are sectional views of the first pair of dies, showing them in an open and closed position, respectively, the latter being a view on the line $x\,x$ of Fig. 2. Fig. 5 is a view of the blank bar. Fig. 6 is a view of the same after being submitted to the action of the dies. (Shown in Figs. 1 to 4.) Fig. 7 is a face view of one of the second pair of dies to which the blank is submitted, the companion die being of similar form. Fig. 8 is a section on the line $y\,y$ of Fig. 7. Fig. 9 is a section on the line $z\,z$ of Fig. 7. Fig. 10 is a view illustrating the operation of punching the eye of the blank while held between a pair of dies like that shown in Fig. 7. Fig. 11 is a view of the headed and punched blank. Fig. 12 is a view of the bit-welding dies, and illustrates their operation.

Like letters of reference indicate like parts in each.

The machine referred to has a pair of die-carriers, $a\,b$, pivoted to a reciprocating head, $c$, which moves preferably in a vertical direction. Below the head $c$ is a bed, $d$, having two uprights or standards, $d'$, each provided with a short incline, $d^2$, which inclines stand in the path of the die-carriers $a\,b$, so that when the latter descend by the movement of the reciprocating head $c$ their rounded corners $a'\,b'$, encountering the inclines $d^2$, cause them to be forced together, so that they descend between the vertical sides of the standards $d'$.

The dies $e\,f$ constitute the first pair of my series of vise-forming dies. The female die $f$ has a matrix, $f'$, for receiving the blank $j$; as indicated in Figs. 1 and 3, the inner end of which widens out transversely to the form of the T-head of the vise-jaw. The bottom of the matrix $f'$ is recessed, as at $f^2$ and $f^3$, to give the proper form to the outer side of the blank $j$, as shown in Fig. 6. The recess $f^2$ enables the shank of the jaw to be forced laterally beyond the plane of the T-head, and the recess $f^3$ forms the preliminary heel $j^3$ of the jaw. Mounted in guides $g'$ in the rear end of the die $f$ is a plunger, $g$, the front end of which forms the rear wall of the matrix. The purpose of this plunger is to upset the end of the blank $j$ to form the T-head of the jaw.

In the machine illustrated, the plunger $g$ is operated by a wedge, $h$, secured to the bed-plate $d$, and working in a vertical recess, $f^4$, in the die $f$ back of the plunger.

The operation is as follows: The dies $e$ and $f$ being mounted in the die-carriers $a\,b$, the plunger $g$ being retracted, and the blank $j$ being inserted into the die $f$, as illustrated in Fig. 1, the descent of the head $c$ causes the plunger $g$ to be forced inward by the incline $h$ against the end of the blank $j$ and upset the same, filling the transverse cavity of the matrix and forming the T-head of the jaw. The wedge $h$ is supported behind by a rear shoulder, $f^5$. It is apparent, however, that the die $f$ with plunger $g$ can be used without the machine described, and other means adopted for operating the plunger from behind, as will be understood, and hence I do not limit my claim to the use of the dies with the machine shown.

The male die $e$ has a plain face, a projection, $e'$, which enters the matrix $f'$ of the die $f$ opposite to the recess $f^2$, and a round corner, $e^2$, which gives shape to the inner or concave side of the jaw at the point where the shank merges into the head, as shown at $j'$, in Fig. 6.

The operation of the dies is as follows: The blank $j$ is placed between them, as indicated in Figs. 1 and 3, resting on the seat $f^6$, and the dies are closed together on the same. The projection $e'$ forces the shank into the cavities $f^2 f^3$ beyond the face of the jaw and forms the preliminary heel $j^3$, and at the same time the plunger $g$, being forced inward, upsets the end of the blank into the transverse portion of the matrix and forms the head $j^2$. The product of this operation is the partially-formed blank shown by Fig. 6. This blank is then submitted to the operation of a pair of dies, $i$, the construction and operation of which are illustrated in Figs. 7 to 10. These dies are similar in form, and each has a main cavity, $i'$, extending longitudinally inward from the rear end, which cavity merges downward and laterally, as at $i^2$, into a cross cavity, $i^3$, which receives the T-head, said cross cavity $i^3$ being in a lower plane than the cavity $i'$, because the T-head stands out beyond the adjacent side of the shank. Extending through the die at right angles to the cavity $i'$, which it intersects, is a cavity, $i^4$, designed for the passage of the punches $l\ l'$, Fig. 10, which form the eye $j^5$ of the jaw.

The cavities $i'$, $i^2$, and $i^3$ are narrower than the parts of the blank in Fig. 6, upon which they act, so that one effect of the dies $i$ and punches $l l'$ is to displace a portion of the metal and force it into the ends of the cavity $i^3$ and into the heel-cavity $i^5$, thereby lengthening and completing the formation of the T-head $j^2$ and heel $j^4$, Fig. 11. These dies also shape the outer surfaces of the jaw. These dies may be used with the machine described, as illustrated in Figs. 1 and 2, by mounting them in the pivoted die-carriers $a\ b$, and securing the punches $l\ l'$, one to the bed $d$ and the other to the head $c$, as shown in Fig. 10. I do not, however, limit myself to their use with the said machine, as the reciprocating motion necessary to their operation may be given to the moving die and punch by other forms of machines or presses well known in the art, or by means of a suitable drop-hammer, as will be understood. The blank thus produced may be finished and the steel bit $o$ applied thereto by putting it through the dies $m$ and $p$. It requires to be reheated for this purpose.

By the use of my improved dies $e$, $f$, and $i$, I am enabled to make vise-jaws of one piece of metal, thus avoiding imperfect welds and cross-fibers, and to obtain great uniformity of product and an increased output over the old practice of hand forging and welding. The dies $i$ may be used without the punches $l\ l'$, in which case the cavity $i^4$ would not be used, and the eye would be punched by a subsequent operation and separate punches. I prefer, however, the construction shown, because thereby these dies act not only for shaping, but also for holding, the blank while being punched, and save extra handling and loss of time. The recess $f^3$ may be dispensed with, if desired.

I do not limit myself to the use of the die $f$ with an upsetting-plunger, $g$, for the reason that such plunger may be dispensed with and the end of the blank $j$ upset by a previous operation before being placed in the said die, as will be readily understood.

By the term "male die" in the first claim I mean a die or plunger which, co-operating with the die $f$, will force the shank of the blank beyond the plane of the head into the recesses of the die $f$, whereby the shank is shaped.

What I claim as my invention, and desire to secure by Letters Patent, is—

1. The vise-jaw die $f$, having a T-shaped matrix recessed in the bottom to receive and shape the shank of the jaw, in combination with a male die, whereby the shank is forced beyond the plane of the head, substantially as and for the purposes described.

2. The combination of the dies $e f$ and plunger $g$, substantially as and for the purposes described.

3. The combination of the series of vise-jaw-forming dies $e$, $f$, and $i\ i$, constructed and operating substantially as and for the purposes described.

In testimony whereof I have hereunto set my hand this 9th day of September, A. D. 1885.

CHRISTIAN KONOLD.

Witnesses:
 W. B. CORWIN,
 THOMAS W. BAKEWELL.